(12) United States Patent
Kleo et al.

(10) Patent No.: US 9,664,835 B2
(45) Date of Patent: May 30, 2017

(54) LUMINOUS MULTIPLE GLAZING UNIT FOR AN ITEM OF FURNITURE

(75) Inventors: Christophe Kleo, Attichy (FR); Bastien Grandgirard, Marqueglise (FR); Alexandre Richard, Paris (FR); Adèle Verrat-Debailleul, Villers-sur-coudun (FR); Pascal Bäuerle, Roye (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 311 days.

(21) Appl. No.: 14/344,033

(22) PCT Filed: Jul. 30, 2012

(86) PCT No.: PCT/FR2012/051794
§ 371 (c)(1),
(2), (4) Date: Mar. 10, 2014

(87) PCT Pub. No.: WO2013/017792
PCT Pub. Date: Feb. 7, 2013

(65) Prior Publication Data
US 2014/0369063 A1 Dec. 18, 2014

(30) Foreign Application Priority Data
Jul. 29, 2011 (FR) ...................................... 11 57013

(51) Int. Cl.
*F21V 7/04* (2006.01)
*F25D 23/00* (2006.01)
(Continued)

(52) U.S. Cl.
CPC .......... *G02B 6/0005* (2013.01); *A47F 3/0434* (2013.01); *A47F 11/10* (2013.01);
(Continued)

(58) Field of Classification Search
CPC .... F21V 33/0012; A47F 11/10; A47F 3/0434; B32B 17/10541; B60Q 3/002;
(Continued)

(56) References Cited

U.S. PATENT DOCUMENTS 5,910,083 A * 6/1999 Richardson ......... E06B 3/66366
312/116
6,059,420 A * 5/2000 Rogers .................. A47F 3/0434
362/223

(Continued)

FOREIGN PATENT DOCUMENTS

EP 1 154 199 11/2001
EP 1 491 835 12/2004
(Continued)

OTHER PUBLICATIONS

International Search Report and Written Opinion as issued for International Application No. PCT/FR2012/051794, dated Jan. 2, 2013.

(Continued)

*Primary Examiner* — Renee Chavez
*Assistant Examiner* — Erin Kryukova
(74) *Attorney, Agent, or Firm* — Pillsbury Winthrop Shaw Pittman LLP

(57) ABSTRACT

A luminous multiple glazing unit of a door of furniture notably refrigerated includes a first sheet of mineral glass or organic glass, a second sheet separated from the first sheet by peripheral spacer, a peripheral light source with a source support, a light extraction device for extracting the guided light to form at least one luminous zone, the source support being in a housing surrounded by material, forming a framing, including an assembly element, covered by a cap, the cap and the diode support being removable from the glazing unit.

22 Claims, 6 Drawing Sheets

(51) Int. Cl.
*F21V 8/00* (2006.01)
*F21V 33/00* (2006.01)
*A47F 3/04* (2006.01)
*A47F 11/10* (2006.01)
*F21V 31/00* (2006.01)
*F21W 131/301* (2006.01)
*F21Y 105/00* (2016.01)
*F21Y 101/00* (2016.01)

(52) U.S. Cl.
CPC ........ *F21V 33/0012* (2013.01); *G02B 6/0095* (2013.01); *F21V 31/005* (2013.01); *F21W 2131/301* (2013.01); *F21Y 2101/00* (2013.01); *F21Y 2105/00* (2013.01)

(58) Field of Classification Search
CPC .... B60Q 3/004; G02B 6/0095; G02B 6/0005; F21W 2131/305; F25D 23/02; F25D 23/021; F25D 23/023; F25D 23/025; F25D 23/026; F25D 23/028
USPC ............... 362/611, 612, 613, 614, 632–634; 62/264; 312/116
See application file for complete search history.

(56) References Cited

U.S. PATENT DOCUMENTS

| | | | |
|---|---|---|---|
| 6,736,534 B1* | 5/2004 | Fite | E06B 7/30 362/145 |
| 2002/0007576 A1* | 1/2002 | Gai | G02B 6/0031 40/546 |
| 2002/0131261 A1* | 9/2002 | Inui | G02B 6/0018 362/612 |
| 2004/0031234 A1* | 2/2004 | Emde | F21S 11/00 52/786.11 |
| 2004/0040228 A1* | 3/2004 | Emde | B32B 17/10165 52/173.3 |
| 2004/0172892 A1* | 9/2004 | Cremaschi | E06B 3/6715 52/171.3 |
| 2005/0081547 A1* | 4/2005 | Avenwedde | F21V 23/06 62/264 |
| 2005/0105303 A1* | 5/2005 | Emde | B32B 17/10045 362/616 |
| 2006/0005484 A1* | 1/2006 | Riblier | A47F 3/0434 52/204.5 |
| 2007/0133192 A1* | 6/2007 | Alessandro | A47F 3/0434 362/125 |
| 2008/0024047 A1* | 1/2008 | Juo | A47F 3/043 312/405 |
| 2009/0272136 A1* | 11/2009 | Knoll | A47F 3/001 62/251 |
| 2010/0073959 A1* | 3/2010 | Hamada | G02B 6/0085 362/611 |
| 2011/0157908 A1* | 6/2011 | Iwai | B60Q 3/004 362/509 |
| 2011/0267833 A1* | 11/2011 | Verrat-Debailleul | B32B 17/10036 362/545 |
| 2012/0106129 A1* | 5/2012 | Glovatsky | A47F 3/001 362/92 |
| 2012/0285089 A1* | 11/2012 | Artwohl | A47F 3/0434 49/70 |
| 2014/0218934 A1* | 8/2014 | Mueller | B32B 17/10055 362/296.01 |

FOREIGN PATENT DOCUMENTS

| | | | | |
|---|---|---|---|---|
| EP | 1 655 536 | | 5/2006 | |
| FR | WO 2010049638 A1 * | | 5/2010 | ....... B32B 17/10036 |
| FR | 2955539 A1 * | | 7/2011 | |
| WO | WO 01/90787 | | 11/2001 | |
| WO | WO 03/008877 | | 1/2003 | |

OTHER PUBLICATIONS

International Preliminary Report on Patentability as issued for International Application No. PCT/FR2012/051794, dated Feb. 13, 2014.

* cited by examiner

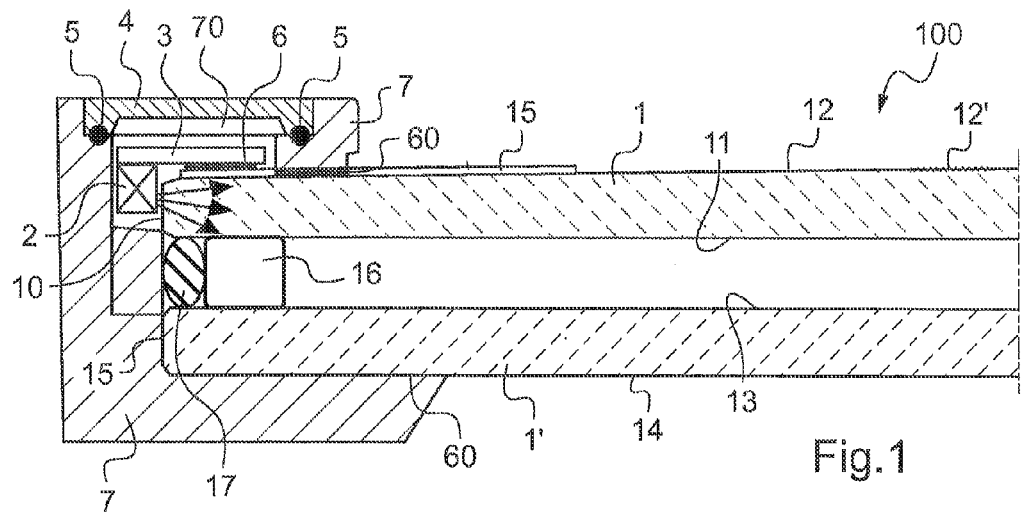
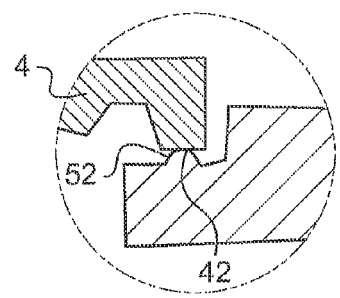
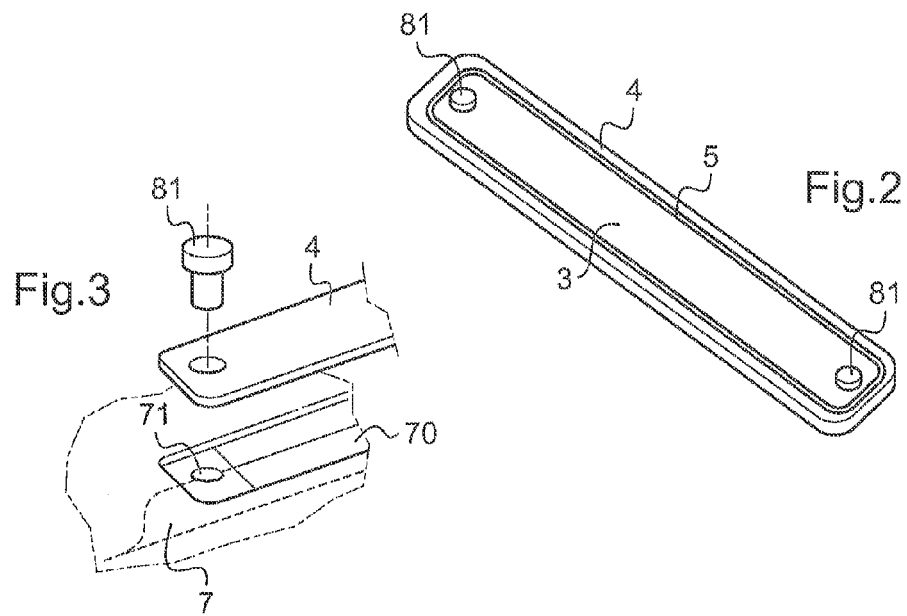

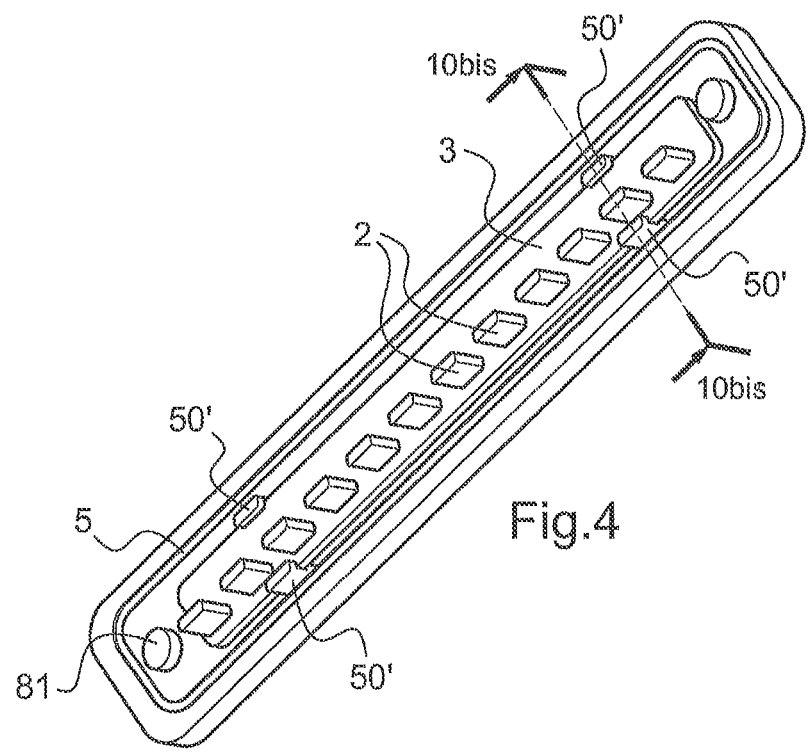
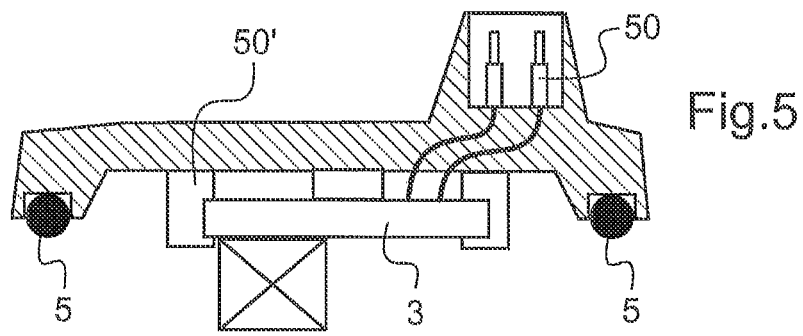
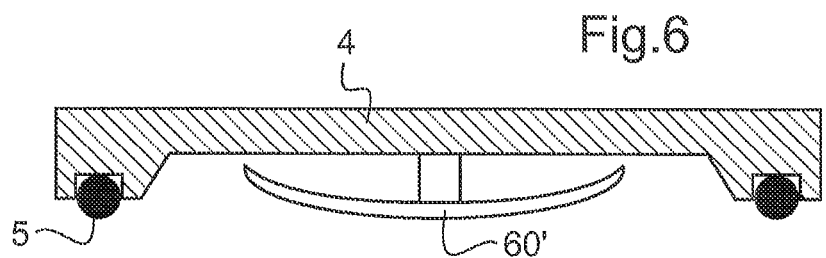

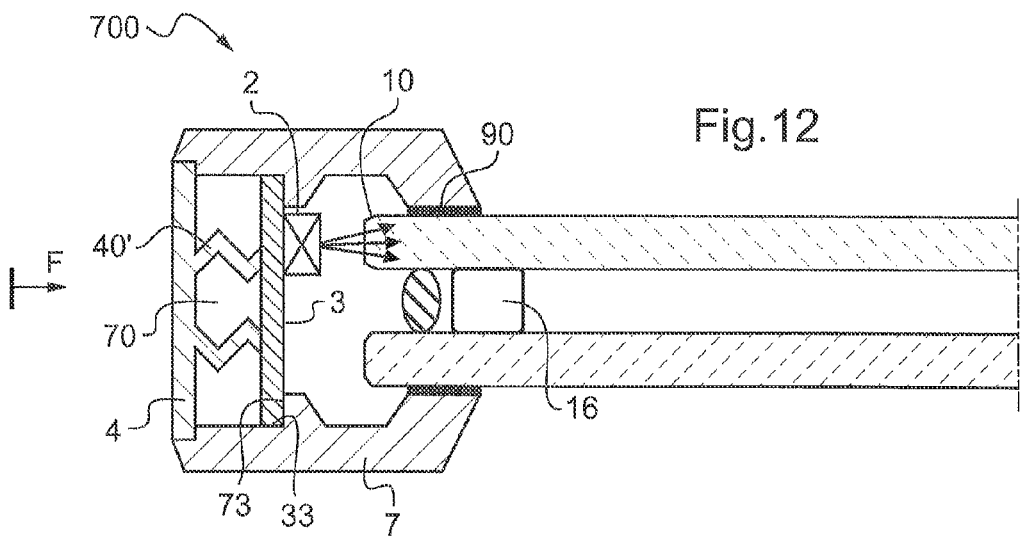
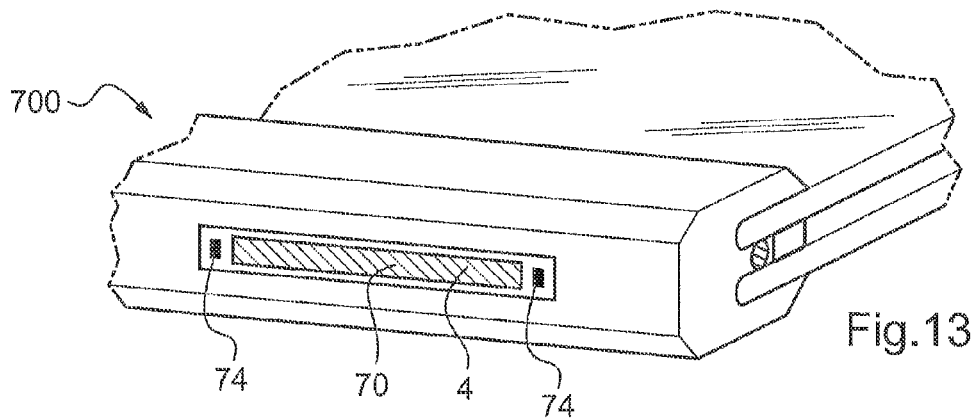
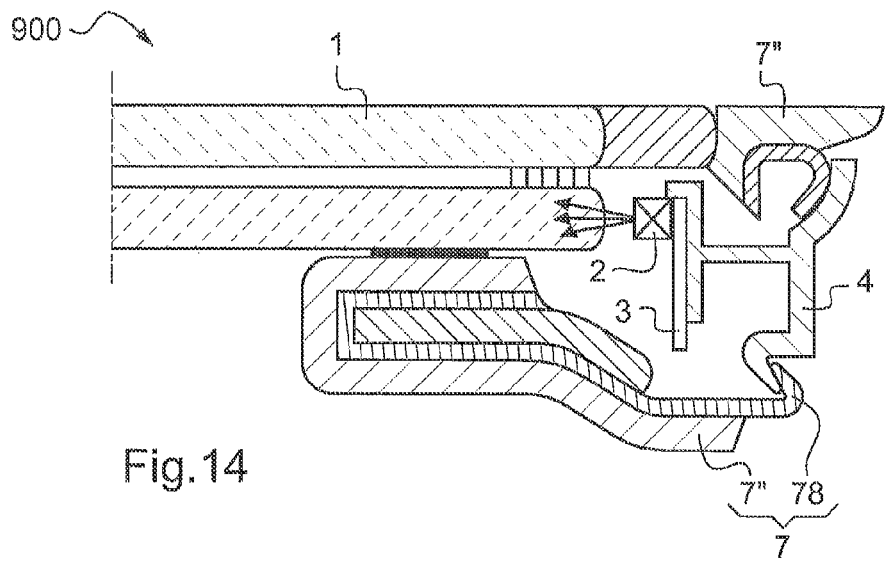

LUMINOUS MULTIPLE GLAZING UNIT FOR AN ITEM OF FURNITURE

CROSS-REFERENCE TO RELATED APPLICATIONS

This application is the U.S. National Stage of PCT/FR2012/051794, filed Jul. 30, 2012, which in turn claims priority to French Application No. 1157013, filed Jul. 29, 2011. The content of both applications are incorporated herein by reference in their entirety.

The present invention relates to multiple glazing units for doors of furniture, notably refrigerated, and in particular luminous multiple glazing units for doors of furniture, notably refrigerated, notably with light-emitting diodes.

An insulating glazing unit is known, intended for the openable door of a refrigerated cabinet, with cold or frozen products, such as food products or drinks, or any other products that need to be stored cold, for example pharmaceuticals or even flowers, displayed in said cabinet. The insulating glazing unit consists of at least two glass substrates separated by a gas-filled gap and with at least one of them provided with a low-emission coating.

When products stored in a refrigerated cabinet must remain visible, as is the case in many existing commercial premises, the refrigerated cabinet is equipped with glazed members that transform it into a refrigerated "show case", commonly called "refrigerated display cabinet". There are several variants of these "display cabinets". Some are in the form of a cupboard, and then it is the door itself that is transparent, while others are in the form of chests and it is the horizontal lid that is glazed to allow the contents to be viewed.

In these types of display units, it is necessary for the merchandise to remain perfectly visible to the customers so that it is possible to preselect the merchandise without opening the "display cabinet".

However, one of the main problems encountered with these display cabinets is the appearance of condensation on the external face of the opening member located in the shop. In fact, this external face is cooled by the refrigerated environment located opposite, on the internal face in contact with the interior environment of the cabinet, while being in contact with the ambient atmosphere of the shop, which is much more laden with humidity, and is at a far higher temperature; when the temperature of this outer surface is at a temperature below the dew point, condensation forms, impeding the visibility of the merchandise.

Another important problem is also the formation of condensation, or even of frost on the internal face of the opening member on opening the display cabinet to take out the merchandise. In fact, the surface of the inner glass substrate, which was at a very low temperature, even below 0° C., then comes in contact with the ambient atmosphere, which is much more laden with humidity, and is at a far higher temperature; the temperature of the inner substrate is then below the temperature of the dew point, which causes a phenomenon of condensation on the substrate, or even of frost when this substrate is at a negative temperature. The presence of condensation or of frost interferes with the visibility of the merchandise, and it takes several minutes, or even tens of minutes, for the condensation or frost to disappear completely.

To limit these drawbacks, insulating glazing units were designed in the prior art, with a reinforced thermal insulation property, namely double or triple glazing units provided with one or more low-emission coatings, and with a heating substrate in contact with the cabinet interior.

Moreover, from patent application WO 03/008877, a glazing unit is known with reinforced thermal insulation for refrigerated cabinets that ensures, according to this document, disappearance of condensation on the external face of the opening member, on the shop side.

This type of insulating glazing unit consists of triple glazing comprising three glass substrates with thickness of 3 mm, separated by gas-filled gaps of identical thickness of 8 or 13 mm and consisting of air, argon or krypton, two low-emission coatings being arranged on faces 2 and 5 of the glazing unit (counting from the outermost face of the glazing unit in the closed position on the cabinet).

As for the lighting function, it has not been optimized.

Thus, the present invention relates to a luminous multiple glazing unit of a door of furniture notably (refrigerated) with an environment-friendly and effective light source (light-emitting diodes, optical fiber(s) coupled to diodes, for example), robust and easily upgradable, while remaining simple and compact, thus meeting the specifications imposed by the manufacturers (maker's guarantee, adaptability of performance, etc.).

For this purpose, the invention proposes a luminous multiple glazing unit of a door of furniture notably refrigerated comprising:

a first sheet of mineral glass or organic glass (PC, μmMA, PU, or even ionomer resin, polyolefin, thick or thin), having a first main face and a second main face and an edge, a second sheet separated from the first sheet by a gas-filled gap (air or inert gas), an optional third sheet separated by a gas-filled gap (air or inert gas)

a peripheral light source with a support strip called source support, the source being selected from a self-supporting optical fiber of the cord type with a lateral portion forming the emitting zone and from light-emitting diodes each comprising a semiconductor chip with an emitting face, the support strip of the diodes, being of the printed circuit board type, the emitting zone or face being opposite the edge, called the injection edge, of the first sheet for propagation of the visible and/or ultraviolet called UV light injected in the thickness of the first sheet, the first sheet then performing the role of guide of the injected light, means for extracting the guided light to form at least one luminous zone, the source support being in a housing surrounded by material (hollowed out for example), forming a framing, including an assembly element, notably functional, notably which is impervious to fluid(s), notably to liquid water or even water vapor, which is (a component) built-up or an overmolding and covered by a cap (on the assembly element) notably which is impervious to fluid(s), notably to liquid water or even water vapor and dust, the cap and the source support, notably of diodes being removable from the glazing unit (support removable alone or with the cap), in particular the cap is removable from the assembly element.

Integration of the source such as an LED array is difficult or even impossible in the case of an extrusion or a molding owing to the risk of degradation of the lighting function, glazing unit and seal.

Complete "monolithic" encapsulation, notably by overmolding (encapsulation, etc.) or with a coating of glue, of adhesive, in which the light source (for example the LED arrays) is completely encapsulated makes the light source difficulty accessible without damaging it (glazing unit/LED, encapsulation etc.) and preventing reuse of this glazing unit. Moreover, complete encapsulation is challenging and can cause deterioration of the source in particular the LEDs (and/or their electronic circuit) already mounted, causing high costs of rejects, unless precautions are taken, which make manufacture complex.

The invention therefore consists of producing a glazing unit whose light source (LEDs, optical fibers) is built into a housing provided for this purpose at the periphery of the glazing unit.

Integration of a light source can be achieved without impairing a clear view. An item can be made with a flush strip by gluing or overmolding integrating the light source, thus facilitating cleaning of the glazed area.

Naturally, the multiple glazing unit can comprise:
an antifrost layer,
and/or a low-emission layer,
and/or a heating layer.

Preferably, the second sheet and a third sheet comprise one or these layers and the light-guide sheet does not comprise optionally one or two of these layers notably on the face or at least the light extraction zone.

In the solution according to the invention, the cap is easy to (re)position, notably on the assembly element, removable (detachable and/or extractable and replaceable at little cost) if necessary:
for changing the light source (LEDs etc.) and/or the electronic control system thereof during repair, or recycling or
to meet new requirements of optical performance desired by the customer (change of color(s), of power, of frequency, of control) or by new standards imposed,
and/or for adding sources (LED and/or optical fiber) and/or electronic controls in a glazing unit with recess.

The invention thus facilitates modular design of the lighting proposed for the glazing unit (glazing unit that is luminous or can become so, variation of color, intensity, etc.)—at the level of logistical management of the flows in production (advanced deposition assembly rather than at the request of the customer).

The invention reduces the impact of integration of the source (LEDs etc.) on the choice of methods and materials and makes it possible not to be dependent on a production technology as it offers a wide panel of solutions of preassembly or of encapsulation that can be used.

The invention makes possible the manufacture of a luminous multiple glazing unit of a door of furniture notably (refrigerated) with a functional element, provided on the glazing unit in the usual way, notably manufactured by the usual techniques (extruded, molded etc.), and the functional element can be modified appropriately (hollowed out) for housing the LEDs in post-assembly.

The cap both protects and provides easy access to the light source and preferably participates in its maintenance/positioning in the housing.

The cap can be said to be essentially facial (parallel, along the mid-plane of the glazing unit), or is lateral (parallel, along the mid-plane of the injection edge).

The cap is separate from the assembly element (separate from a sheet of mineral glass) and is preferably:
positioned, notably mechanically, for example with stops, on the assembly element and not on a mineral glass
and/or is maintained in position on the assembly element and preferably not on a mineral glass.

Preferably, the distance between the emitting face or zone (at a distance from the edge) and the injection edge can be less than 2 mm, or even less than 1 mm, notably from 0.2 to 2 mm or even from 0.5 to 1 mm.

The means for holding the cap in position, also referred to as cap holder, (on a rigid or flexible element) are reversible (detachable) and are preferably:
clipping means, (preferably on a rigid element): single and double clip, Christmas Tree type or single-branch type
screwing means, (preferably on a rigid element)
means of the scratch type
magnetizing means
and/or the means for holding the source support in position, also referred to as source support holder, optionally carried by the cap are reversible and notably:
clipping means, (preferably on a rigid element): single and double clip, Christmas Tree type or single-branch type
screwing means, (preferably on a rigid element)
means of the scratch type
magnetizing means
or optionally permanent if carried by the cap (glue etc.).

The clipping means (cap on framing or support/cap) can be of point type (lugs, etc.) or extended (i.e. extending over the full length of the cap), arranged on the internal face of the cap, preferably forming an integral part of the cap, (preferably in the sealing zone defined by an interfacial sealing element).

The clipping means are for example of the hook type, forming an integral part of the cap or added independently.

The screwing means (such as screw, bolt) can project from the internal face (for example housed in holes in the cap or forming an integral part of the facial cap, optionally via blind holes), notably between an interfacial sealing element and the edge of the housing.

One or more stops are useful for positioning the support and/or the cap.

It is preferable to avoid any adhesive system (glue), even reversible, as well as any assembly by force of the cap or source support on the assembly element (or on the cap).

For dismantling the cap and/or the source support, it is possible to provide gripping means, notably: notch, loop, recess, rod, breaking zone, etc., dismantling preferably by means of a tool.

The source support can be removable from the glazing unit because it is carried by the removable cap of the glazing unit. The support can be fixed permanently (not easily removable) on the cap. This is the case when it is preferred to change the entire cap+source support assembly.

The cap does not necessarily have a role in holding the source support in position, and then holding in position is preferably (at least partly) provided by an assembly element.

The housing can be of any possible shape: oblong, oval, rectangular, etc.

The width of the housing can be between 5 and 200 mm and preferably between 10 and 40 mm.

The length of the housing can be between 10 and 1000 mm, preferably between 50 to 600 mm.

The depth of the housing is sufficient, for example from 1 mm to 100 mm, preferably from 2 to 20 mm (or even less if opposite the edge).

The material framing the source support is impervious to fluids (assembly element and/or overmolding for example) and the cap is impervious to fluids.

The cap can be associated with an interfacial element, for interfacial sealing against fluid(s) and to dust, notably to liquid water or even water vapor.

The local interfacial element for sealing against fluid(s) is for example at the periphery of the internal face of the cap or on one side of the cap, and notably the interfacial element for sealing against fluid(s) forms a cord.

Thus, the luminous multiple glazing unit is durable, even when the glazing unit is not protected, owing to the simple and appropriate sealing means, eliminating paths for the spread of fluid(s).

Moreover, the assembly element associated with the cap and with the optional interfacial sealing element is useful in particular for humidity protection of the source, notably of the chips, to prevent contamination of the coupling space (dirt, organic pollution, such as molds, etc.) and preferably to cleaning products, or to washing by high-pressure jet. This protection must be long-lasting.

To facilitate dismantling and reassembly, the interfacial sealing element, preferably at the periphery of the cap, can be a compressed material, the sealing by compression of the material being achieved by a closing force of the means for fixing the cap, and notably the interfacial sealing element is selected from:
  a polymer seal for example of TPE, of EPDM notably an O-ring seal, with sealing lip(s), the seal notably being in a recess or a groove in the cap, or a groove in a framing (functional element, assembly element) or of the second face,
  a sealing strip on the framing (notably the functional element, the assembly element), selected to be polymeric, for example lip(s) of encapsulation or of preassembled seal, notably of EPDM, or on the internal face or a side of the polymer cap,
  a foam, notably acrylic foam, PU, rubber (EPDM etc.), elastomeric thermoplastics, of TPE, of polyester, notably of single-component polyester rubber such as the product Dynafoam sold by the company Saint-Gobain Performance Plastics, It is thus no longer necessary to use sealing adhesive.

Alternately or cumulatively, the diode support at least (or even the chips) is provided, advantageously before its integration in the glazing unit (during manufacture etc.), of at least one (single-layer or multilayer) protective layer against moisture and/or an encapsulation such as a varnish of the silicone, epoxy or acrylic type.

This allows easy integration in the housing provided in the glazing unit (said integration not requiring complex provision of hermeticity between the recess and the external environment).

More precisely, the protective layer protects at least printed circuit, soldered joints, connectors if not impervious.

The diodes (at least the emitting face) are preferably not protected in this way if already covered (pre-encapsulated) with silicone.

The LED arrays are protected before they are integrated in the housing (recess of the functional element etc.). The protection can be of the protective varnish type (silicone, epoxy, acrylic, etc.), encapsulation or "potting" of the LED array (silicone, epoxy, acrylic, etc.).

We may mention the tropicalization varnishes sold by Syneo, based on acrylic or PU or silicone.

We may mention the Abchimie protective varnish. Deposition is by dipping, selective deposition or vapor deposition (layers of 25-50 microns).

Owing to the protective layer, perfect hermeticity between the surface of the cap and the framing is no longer indispensable but can be provided additionally. The two hermeticity solutions can also be combined for more security, or to prevent degradation of the module due to the humidity of the air trapped in the cavity once the cap is mounted.

At the very least, the cap is not necessarily impervious (to fluids). It preferably protects against ingress of material that might be put between the diodes, the source and the injection edge but no hermeticity against humidity and liquid water necessary. The cap can be pierced for passage of a wire for example.

This facilitates design of the interface between the cap and the assembly element and facilitates the manufacturing process of the glazing unit.

The cap can further comprise a blind recess for passage of the connections and can further comprise:
  optional integration of the wires and connections for electrical supply (for example from one diode array to another) prior to integration of the diodes (overmolding of the wires or provide grooves in the module, etc.),
  facilitating exit of the wires relative to the main supply connectors (which can be the battery, a photovoltaic source, etc.) at the level of the cowling zone by means of an integrated pin.

Moreover, based on a recess of predetermined size and a cap carrying the source, the invention allows proper positioning of the diode relative to the injection zone for the light.

The distance between the emitting face or zone and the injection edge is controlled by means for positioning and means for holding in position, called blocking, of the source support in the three directions of an orthogonal frame of reference, said positioning and blocking means comprising a system for assembly of the source support, joined to the first sheet, including an assembly element positioned relative to the injection edge.

According to the invention, it is possible for example to define a reference XYZ in which:
  Z is the longitudinal direction of the injection edge
  Y is the transverse direction of the injection edge (therefore normal to the general faces of the glazing unit)
  X is the direction normal to the injection edge (therefore parallel to the general faces of the glazing unit).

The positioning of the source support on the cap can be managed by the process (positioning calculated by the trajectory of a robot) or preferably mechanically by means of stops to simplify the management of replacement.

The positioning of the source support opposite the injection edge can be managed by the process (positioning calculated by the trajectory of a robot) or preferably mechanically by means of stops to simplify the management of replacement.

The system for assembly of the source support preferably includes the cap.

Moreover, the distance between the emitting face or zone of the source and the injection edge is controlled by the alignment means according to the invention, namely the means for positioning the source support (and preferably the cap) and for holding the source support (and preferably the cap) in position.

The emitting face or zone (for the diode, preferably chip with its preencapsulation—of the silicone type etc.) can approach, in a controlled manner, as closely as possible to the injection edge without risk of contact with the edge.

In a preferred embodiment according to the invention, it is possible to lock all of the components employed for installation of the source: assembly (fixation) element, preferably cap, and source support (the diode support or self-supporting fiber).

The cap (curved, flat, L-shaped etc.) is a component that is sufficiently rigid for locking.

The assembly element, separate from the (mineral) glass sheet or guide sheet, is a built-up component and/or a coating of the overmolding type, and is preferably sufficiently rigid for locking.

Preferably, the positioning of the source support (and preferably of the cap whether or not carrying the support) is not done under stress as this involves excessive deformation and thus does not allow precise control of position: there is not just one possible position, but several.

The means for positioning the cap, notably on the assembly element, are preferably by contact(s) without deformation of the assembly element, notably selected from mechanical means such as:
  stops in the assembly element for the cap carrying the support, notably inclined stop, flat or linear support, point support, swivel, pivot.

The means for positioning the support on the cap are preferably
  either by contact(s) without deformation of the cap, notably selected from mechanical means such as stops, notably flat or linear support, point, swivel, pivot, held permanently by snap-fitting or removable by clip
  or by interference-fit connection (force assembly, etc.) or the means for positioning the support on the assembly element are by contact(s) without deformation of the source support, notably selected from mechanical means such as stops, notably flat or linear support, point, swivel, pivot, (with holding in position of the snap-fitting type for example)

The means for holding the support in position are preferably by contact(s) without overall deformation of the assembly element (no deformation or local deformation without any influence on the positioning, once mounted), notably selected from mechanical means.

The means for holding the cap in position, notably on the assembly element, are preferably separate from the means for positioning the cap (otherwise this large component can move) and/or the means for holding the source support in position are preferably separate from the means for positioning the source support.

The assembly element is for example:
  a component (built-up on the first sheet) that is annular and monolithic, and therefore hollow with closed contours, on the perimeter of the housing, of plastic that is sufficiently rigid and/or of metal,
  or is a component (built-up on the glazing unit) in several separate parts, of plastic that is sufficiently rigid and/or of metal,
  or is of a polymer encapsulation material, overmolded on the first sheet with a local recess to house the source, notably of plastic that is sufficiently rigid, and a wall delimiting the recess is for example positioned relative to the injection edge.

The support can be positioned in the assembly element by the positioning means, and preferably the cap comprises or interacts with elements, which in the mounted position of the cap, are the means for holding the support in position in the assembly component (element).

Thus, the diode support is (pre)positioned independently of the cap on the assembly element, without permanent fixing such as gluing, with stops for positioning relative to the assembly element (made of a material that is sufficiently rigid), and a flexible element, notably of the curved tongue or spring type, bears on the support and forms the means for holding the support in position.

The cap can carry the source support, which is positioned by means of elements for positioning and holding in position (temporary or permanent) according to the three axes of the orthogonal frame of reference and the cap is positioned relative to the assembly element and/or to the edge of the glass (stop, for example normal to the internal face of a lateral cap, projecting relative to the diodes and up against the injection edge outside the diode zone) by means of other elements for positioning and holding in position according to the three axes.

The assembly of the cap, optionally carrying the source support or holding the prepositioned source support in position, is by rotation and reversible fixation.

For example, said cap has a longitudinal base—(optionally longer base than the housing)—with first and second parts:
  the first part (end) being supported on a first part of the assembly element called rotating guide part, the first part is (mounted) movable in rotation relative to the glazing unit, from a rotation axis (fixed or moving axis following assembly notably parallel (for example offset) to the injection edge (in the mid-plane if the injection edge is curved or beveled), metallic part and/or preferably of plastic that is sufficiently rigid,
  the second part bearing reversible means for holding the cap in position, preferably received in one or more so-called receiving zones of a second part of the assembly element, called linking part, or conversely the second part bearing one or more so-called receiving zones, receiving reversible means for holding the cap in position of a second part of the assembly element, notably metallic and/or of plastic that is sufficiently rigid, called linking part, optionally received in a flexible material (polymer encapsulation) for holding of the scratch type.

Assembly by rotation—temporary fixation limits the risks of the light source striking the material surrounding the diode housing notably on the edge of the glass and therefore breaking.

Assembly by rotation—temporary fixation requires little clearance in "Y" (for the kinematics of fixation), Y being the direction normal to the glazing unit if the cap is facial (in the general plane of the glazing unit) or in "X" parallel to the glazing unit if the cap is lateral (in the plane of the edge). This therefore gives better accessibility during installation and dismantling.

Moreover, rotation offers greater freedom of design notably of the orientation of the temporary means for holding in position relative to the injection edge.

Temporary fixation external to the housing (clipping, screwing) makes it possible to reduce the size of the housing.

Assembly by rotation—clipping is simple as it is carried out in one operation for the case when the source (diode support or optical fiber) is fixed (temporary or removable) on the cap.

Assembly by rotation—fitting of the cap and then screwing allows dismantling without degradation of the cap (which is therefore reusable). The design of the cap and of the assembly component is simplified as it is an external component (screw) that provides holding in position/reversible fixation etc.

Double clipping of the cap on the assembly element (preferably of rigid plastic or of metal) is possible, takes up little space in width (in X if the cap is facial, in Y if lateral), notably relative to rotation in a case with a wide support (PCB), but requires clearance (in Y) for the kinematics of clipping.

The linking part of the assembly element is of a material that is able to hold the cap in place for a long time and when subjected to stresses, in other words the material must be sufficiently rigid, and mechanically strong.

In the case of plastic, the guide part—functional element (flexible plastic) assembly can be obtained by co-extrusion (in the case of plastic) or two-material injection.

In the case of metal, the guide part—functional element (flexible plastic) assembly can be obtained by co-extrusion (plastic, notably TPE, EPDM), with rollers at die entrance ensuring proper positioning of the strip and mini-thicknesses of passage of material, and additional steps of piercing or chopping may be necessary notably for removing one or more stiffeners in the sections where the LEDs are located;

by two-material molding/injection (more likely TPE, PVC), studs in the mold ensuring proper positioning of the strip and mini-thicknesses of passage of material.

A functional element can notably surround the guide part.

The metal core (strip) is formed for example preferably by successive folding (roll forming), or by stamping.

Various means can be provided for rotation:

the first end is partly beveled and the rotating guide part preferably comprises a plurality of receiving zones (tabs, of the hinge type but without true "connection" of the cap to the assembly element) of the first end of the cap, along the cap, and preferably offset from one or more local receiving zones, along the cap, reversible fixing means of the cap, the first end and the guide part have complementary shapes: hemispheres, swivels with pin(s), etc.

The assembly element can comprise, in a nonemitting zone, a part opposite or even in contact with the injection edge serving for referencing to the injection edge and forming a stiffener (for example joining the guide part and the fixing part in assembly by rotation and temporary fixation).

The cap and the framing, notably the assembly element, are preferably of roughly identical material (and with the same rigidity).

The assembly element can be fixed to the glazing unit (permanently), notably by gluing, and/or is surrounded by polymer encapsulation (overmolded, notably flexible, of the PU or TP type) on at least one zone at the periphery of the glazing unit and then comprises means for mechanical' anchoring in the encapsulation, of the fin type with holes (prevents movement even if adhesion is not perfect, anchoring that is useful notably for correct positioning of the diodes).

The assembly element (linking part etc.) can preferably be of rigid (thermo)plastic;

polycarbonate (PC), polymethyl methacrylate (PMMA), polyethylene (PE), polypropylene (PP), polyamide (PA66), acrylonitrile butadiene styrene (ABS), and ABS-PC blends thereof, polystyrene (PS), acrylonitrile styrene acrylate ASA, based on formaldehyde polymer (polyoxymethylene POM), polybrominated terphenyl (PBT), preferably with glass fiber filler for even greater strength, notably PA66 GF30 (30% of glass fiber);

metal (steel, aluminum, etc.).

The assembly element is optionally surrounded by or even in contact with or even integral with one or more functional elements that notably provide the esthetic function or aid the flexibility of the contacts with the cap, and which are too flexible to provide holding of the cap for example flexible thermoplastics:

of polyurethane, notably of PU-RIM (Reaction in Mold)

thermoplastic elastomer (TPE), notably compounds based on styrene ethylene butadiene styrene SEBS/polypropylene (PP), thermoplastic TPU, polypropylene PP/EPDM, polyvinyl chloride (PVC), ethylene-propylene-diene terpolymer (EPDM).

The assembly element (the linking part, guide part etc.) can be glued on the glazing unit preferably with a two-sided adhesive tape (acrylic etc.), or optionally with single- or two-component PU glue. Also gluing on an integral flexible part notably that surrounds the linking part.

The glazing unit, and preferably the assembly element, comprises a metal sheet (sheet premounted on plastic component or metal component), forming a barrier to parasitic light, arranged (in parallel) along the first main face beyond the emitting face or zone and optionally going beyond the injection edge (notably in the case of flush polymer encapsulation).

The assembly element can be a functional element, which is the metal core of a preassembled seal, hollowed out locally, optionally covered with a polymer material (outside the zones for positioning and/or holding in position).

The glazing unit comprises a plurality of assembly elements in the form of monolithic components aligned and stacked together by temporary fixing means (with lateral positioning of one assembly element relative to the other).

The assembly element can preferably form a single-face hollowed-out component with closed contour such as a frame.

The assembly element can be on one zone or on the full length of a strip (one side of the glazing unit), it can be on 2 adjacent or opposite strips, or on the whole periphery.

As already mentioned, a peripheral functional element can be joined to the first sheet. The functional element can be an encapsulation, an extrudate, a preassembled seal (wiper), a molding, injection molding, etc.

The functional element is directly on the first sheet or indirectly for example via a reinforcing or adhesive element.

The functional element can thus be joined to the glazing unit by any means:

direct adhesion of the material (molded, etc.), nipping or fitting, joining means of the gluing type, etc.

The functional element can be single-face, two-face, or even three-face.

As already seen, the luminous multiple glazing unit for a door of furniture notably (refrigerated) can notably comprise an overmolded functional element, polymeric, and preferably between the encapsulation and the glazing unit, notably of mineral glass, a layer of single-, two- or three-component primer, for example based on polyurethane, polyester, polyvinyl acetate, isocyanate.

The functional element can be a polymer encapsulation, notably with a thickness from 0.5 mm to several cm, obtained by overmolding.

In the applications of a door of furniture notably (refrigerated), the encapsulation material is generally black or colored (for esthetic and/or masking purposes). The encapsulation can be of polyurethane, notably of PU-RIM (Reaction in Mold). Other materials for overmolding are:

flexible thermoplastics:

thermoplastic elastomer (TPE), notably compounds based on styrene ethylene butadiene styrene SEBS/polypropylene (PP), thermoplastic TPU, polypropylene PP/EPDM, polyvinyl chloride (PVC), ethylene-propylene-diene terpolymer (EPDM), rigid thermoplastics:

polycarbonate (PC), polymethyl methacrylate (PMMA), polyethylene (PE), polypropylene (PP), polyamide (PA66), acrylonitrile butadiene styrene (ABS), and ABS-PC blends thereof, polystyrene (PS), acrylonitrile styrene acrylate ASA.

The overmolding material can be colored, filled with glass fiber.

The layer of single-, two- or three-component primer is for example based on polyurethane, polyester, polyvinyl acetate, isocyanate etc., for example with a thickness from 5 to 50 µm, between the encapsulation and the glazing unit in particular of mineral glass, as this layer promotes adhesion to a mineral glass.

The functional element (overmolded) also supplies a good esthetic finish and makes it possible to integrate other elements or functions:

overmolding of frames, inserts for reinforcement or inserts for fixing the glazing unit, notably for openable glazing units, sealing strip with multiple lips (double, triple, etc.), which are crushed after assembly.

The overmolded functional element can be of any shape, with or without lip.

Preferably a flush framing is produced, i.e. flush with one of the faces of the glazing unit.

The luminous multiple glazing unit of a door of furniture notably refrigerated can comprise a functional element which is notably an overmolding or a glued component (seal, frame), an insert for fixing the glazing unit, the metal core of a preassembled seal, hollowed out locally, optionally covered with a polymer material (flexible etc.), outside the zones for positioning and/or holding in position.

The functional element can be a polymer seal, preferably of elastomer, notably of TPE (for thermoplastic elastomer), or EPDM, some mm thick (typically between 2 and 15 mm).

The seal can be treated with adhesive for holding. The seal can hold simply by nipping or by fitting or by clipping (2 half-frames for example). The seal can be single-face, two-face, three-face. The seal can form a frame. The seal can be of any shape: L-shaped, U-shaped, etc. The seal can be removable at any moment. It can comprise one or more lips put under stress after fixing.

The functional element can be metallic or polymeric, polypropylene (PP), polyamide (PA66), polybutylene terephthalate (PBT) etc., with or without glass fiber filler.

The functional element retains one or more standard functionalities for the glazing unit of a door of furniture notably refrigerated.

The functionality (single or multiple) of the functional element can be one or more of the following:

frame of the glazing unit (single-face, two-face, three-face as already seen), notably with width on the first face from 3 to 100 mm, with thickness from 10 to 40 mm, component for hermeticity to fluid(s) (liquid water, water vapor, cleaning products etc.)

opaque and/or masking component, and/or (point) component for holding mechanical elements.

Preferably, the distance between the internal face of the cap and the first face is less than 10 mm.

Preferably, the distance between the external face of the cap and the injection edge is less than 15 mm. The thickness of the cap can be less than 5 mm.

Moreover, the emitted radiation space before injection, called coupling space, varies naturally as a function of the radiation diagram of the source, defined by a principal direction of emission and an emission cone.

A material can be provided for filling the coupling space that is transparent to said radiation(s), adhesive or not, notably:

a foam, a thermoplastic resin, an adhesive, of the glue type, embedding the chips and fixing the chips to the glazing unit, a double-sided adhesive, glued on the chips and the support by one adhesive face and glued to the glazing unit by the other adhesive face.

As material adhesives (polymers etc.) if necessary fulfilling a function of hermeticity in the short term, we may mention:

UV-crosslinkable glue, a strip (acrylic, PU, etc.) made adhesive with acrylic glue, a transparent glue, PU, silicone, acrylic, a thermoplastic resin: polyvinyl butyral (PVB), ethylene/vinyl acetate copolymer (EVA) etc.

However, the invention makes it possible to avoid addition of an additional element such as mentioned above (filling material and/or adhesive and/or sealant) for effecting optical coupling between the LEDs (bare or preencapsulated) and the glazing unit. Such elements cause extra cost and may alter the color of the light.

Thus, advantageously, the emitted radiation space before injection, called coupling space, is gaseous (one or more gases, for example air). The coupling space is notably free from any wall (cap, assembly element etc.) between the diodes and the edge.

The diodes can be (pre)encapsulated, i.e. comprising a semiconductor chip and an envelope, for example of resin of the epoxy type or of µmMA, encapsulating the chip and having multiple functions: diffusing or focusing element, wavelength conversion. The envelope is common or individual.

The diodes can preferably be simple semiconductor chips for example with a size of the order of about a hundred µm or of mm size.

The diodes can optionally comprise a protective envelope (temporary or not) for protecting the chip during manipulations or for improving compatibility between the materials of the chip and other materials.

The diode can notably be selected from at least one of the following light-emitting diodes:

a diode with lateral emission, i.e. parallel to the (faces of) electrical contacts, with a lateral emitting face relative to the support, a diode whose principal direction of emission is perpendicular or oblique relative to the emitting face of the chip.

As for the source support strip, it can be at the periphery of the edge(s) of the glazing unit: on the edge of the first sheet and/or on the lower face of the first sheet and/or on the upper face of the first sheet.

The source support strip can be of length (and/or respectively width) less than the length (or width) of the coupling edge of the first sheet.

The diode support strip can be a conventional PCB or can be metallic.

The diode support strip can have a rectangular cross section.

The total number of diodes and the power of the diodes are selected according to the size and location of the zones to be illuminated, the desired luminous intensity and the required homogeneity of the light.

The length of the diode support strip varies as a function of the number of diodes and the extent of the surface to be illuminated.

The diode support strip has a length for example of the order of 20 cm. Preferably the number of LED arrays (strip+LEDs) is multiplied to cover the surface.

For greater compactness and/or a simplified design, the diode support strip can also have one or more of the following characteristics:
 it can be thin, notably with a thickness less than or equal to 1 mm, or even 0.1,
 have a metallic surface coating for electrical conduction.

It is possible to provide several identical or similar diode support strips instead of a single support strip notably if the zones to be illuminated are a large distance apart or to illuminate a wide zone.

It is possible to provide a diode support strip with a given reference size multiplied in relation to the size of the glazing unit and the requirements.

For greater compactness and/or to increase the glazing illumination zone, the distance between the part carrying the chips and the first sheet is preferably less than or equal to 5 mm.

The diode support can also be in several parts, one of which can have a function of supporting the electrical circuit and the other the function of radiator for heat dissipation. The space in the housing can be exploited for housing this radiator and to give it an advantageous shape.

The source is separated from the injection edge (by air), is not fixed to the injection edge, and, even the diode support is not fixed on the glazing unit but to the cap to simplify and speed up dismantling.

In an organic sheet, notably of plastic, it is in fact easier to make one or more grooves and/or a peripheral recess than in a sheet of (mineral) glass, notably toughened glass.

In a preferred embodiment, the hole is on the entire perimeter of the second face and the cap forms a frame notably integrating said fixing means (by screwing or clipping etc.).

Preferably, the transmittance of the first sheet around the radiation peak of the chips (perpendicularly to the principal faces) is greater than or equal to 50%, even more preferably greater than or equal to 70%, and even greater than or equal to 80%.

The glazing unit can have a so-called protective layer (a sheet, a film, a deposit, etc.) on one of the first or second faces or extending over said face. This layer can have a dual function:
 scattering of light (for example flexible film of PU, PE, silicone optionally glued with acrylic),
 protection against radiation (IR, UV): solar control, low emissivity etc.,
 antiscratch,
 esthetic (tinted, with patterns etc.).

It is preferably possible to provide rounded edges for the coupling edge or edges of the first sheet. Especially in the case when the emitted radiation space is air, it is possible to make use of the refraction at the air/first sheet interface of suitable geometry (rounded, or even beveled edge, etc.), thus making it possible to focus the rays in the first sheet.

The glass can optionally have previously undergone a thermal treatment such as hardening, annealing, tempering, bending.

In the present description, unless further specified, glass means a mineral glass.

The edge of the first, sheet can be cut out (routing with recesses before dipping) of a multiple glazing unit for housing the diodes there.

The first and/or second sheets can be of any shape (rectangular, square, round, oval, etc.), and can be flat or curved.

The first sheet can preferably be of soda-lime glass, for example of PLANILUX glass from the company SAINT GOBAIN GLASS.

The second sheet can be colored for example of VENUS glass from the company SAINT GOBAIN GLASS.

The means for extracting the light guided via the first and/or the second main face are surface scattering means of the first and/or of the second main face or volume scattering means in the first sheet, and/or when the light injected is UV, means for conversion from UV light to visible light via the first and/or the second main face, which are phosphors notably on the first and/or the second main face.

For extracting the light, scattering means are employed, formed either by a surface treatment of the glass sheet such as sand blasting, etching with acid, deposition of enamel or of scattering paste, or by a bulk treatment of the glass of the laser etching type.

The diffusing layer can be composed of elements containing particles and a binder, the binder allowing the particles to agglomerate together. The particles can be metallic or metal oxides, the particle size can be between 50 nm and 1 µm, and preferably the binder can be mineral for heat resistance.

In a preferred embodiment, the diffusing layer consists of particles agglomerated in a binder, said particles having an average diameter between 0.3 and 2 microns, said binder being in a proportion between 10 and 40 vol % and with the particles forming aggregates with a size between 0.5 and 5 microns. This preferred diffusing layer is described in particular in application WO0190787.

The particles can be selected from semi-transparent particles and preferably mineral particles such as oxides, nitrides, carbides. The particles will preferably be selected from the oxides of silica, of alumina, of zirconia, of titanium, of cerium, or of a mixture of at least two of these oxides.

For example, a mineral diffusing layer of about 10 µm is selected.

For greater compactness and/or to reduce or increase the glazing illumination zone, the distance from the emitting face and from the first sheet can be less than 2 mm. Notably, compact diodes can be used, for example chips without a lens and/or without preencapsulation notably with a width of the order of 1 mm, with a length of the order of 2.8 mm, and with a height of the order of 1.5 mm.

The luminous zone or zones (notably peripheral along one edge of the glazing unit or opposite or adjacent edges, in strip(s), surrounding the glazing unit), internal mood lighting is formed, internal lighting for reading by a side window, roof etc.), a luminous display for internal and/or external signalling.

The luminous zone or zones are notably peripheral, in strip(s) surrounding the glazing unit.

The light can be:
 continuous and/or intermittent,
 monochromatic and/or polychromatic.

For example one or more luminous bands, or a peripheral luminous frame, can be formed as decorative patterns.

It is possible to form a single extracting face.

The invention finally relates to a method of manufacture of the luminous multiple glazing unit of a door of furniture notably refrigerated.

A solution is proposed for post-encapsulation installation of the source notably of the diodes with the advantages already stated above (limitation of scrap, source more easily accessible and/or added, etc.).

According to the design, the assembly element stands all alone on the glazing unit, and the mold will be supported above with pins during overmolding, or it is also possible to use glue of the hotmelt type (PU or PA).

The invention relates to a method of manufacture of the luminous multiple glazing unit of a door of furniture notably (refrigerated), comprising the following steps:
supplying the multiple glazing unit followed by placement and fixation by gluing of the assembly element on the first sheet and/or the second sheet,
assembling the cap with the source support then the cap on the assembly element, preferably by rotation and then reversible fixation, or assembling the support of diodes/light sources on the assembly element and then assembling the cap on the assembly element and on the support, preferably by rotation and then reversible fixation.

or in another embodiment, it comprises the following steps:
supplying the multiple glazing unit, followed by placing in a mold,
placing the assembly element in the mold on the first sheet and/or the second sheet (for example projecting) with a cover containing a seal
closure of the mold on the cover, compression of the seal, overmolding by injection of a polymer encapsulation material (flexible), notably of polyurethane or thermoplastic,
removing the glazing unit from the mold and removing the seal from the zone opposite the injection edge leaving the housing for the source
assembling the cap with the source support and then the cap on the assembly element, preferably by rotation and then reversible fixation, or assembling the source support on the assembly element and then assembling the cap on the assembly element and on the support preferably by rotation and then reversible fixation.

These methods of manufacture according to the invention are compatible with the industrial methods of glazing a door of furniture notably (refrigerated).

Other details and advantageous features of the invention will become clear on reading the examples of glazing units according to the invention illustrated by the following drawings:

FIGS. 1, 7 to 12 and 14 show schematic partial cross-sectional views of the luminous glazing unit of a door of furniture notably (refrigerated) in various embodiments of the invention, FIGS. 1', 2, 3, 4, 5, 6 show schematic views of the cap, FIG. 13 shows a side view of the glazing unit in FIG. 12.

It is to be noted that in the interests of clarity, the various elements of the objects shown are not necessarily reproduced to scale.

Figure 16:
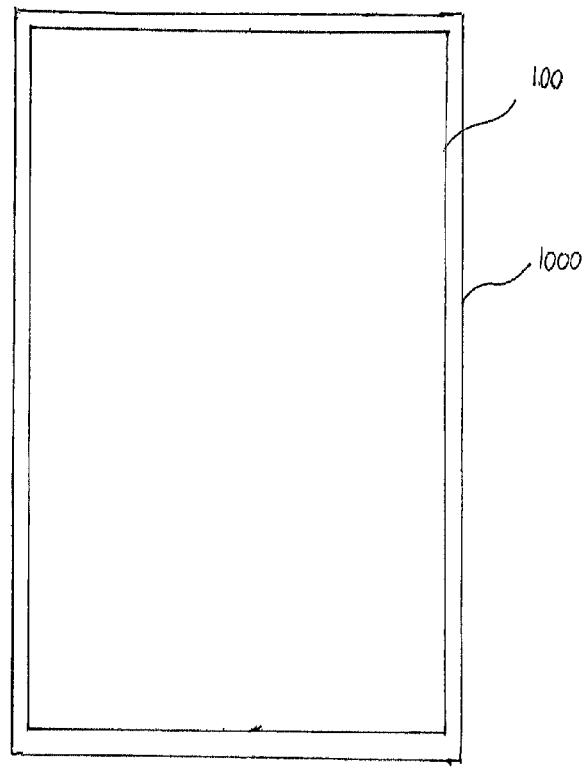
FIG. 16 shows a front view of a furniture including a luminous glazing in accordance with an embodiment of the invention.

FIG. 1 shows a schematic partial sectional view of a luminous multiple glazing unit 100 of a door of furniture notably (refrigerated) 1000 in a first embodiment of the invention. The usual functional layers (antifrost, anticondensation, etc.) are not reproduced here. FIG. 16 shows the furniture 1000 with the luminous multiple glazing unit 100.

This luminous glazing unit 100 comprises a multiple glazing unit comprising:
a first transparent sheet 1, for example rectangular, having a first main face 11 and a second main face 12, and an edge 10, for example a soda-lime-silica glass sheet, with thickness equal to 2.1 mm,
a second glass sheet 1', with a seal 17 and a peripheral spacer 16, forming an insulating glazing unit or even under vacuum (with other optional spacers).

Usually, an interposed element is fixed inside the glazing unit by its lateral faces to the internal faces of the glass sheets with butyl rubber, which also has the role of making the interior of the glazing unit impervious to water vapor. The interposed element is arranged set back inside the glazing unit and near the edges of said glass sheets, so as to provide a peripheral groove in which sealing means of the mastic type, such as consisting of polysulfide or polyurethane, are injected. The mastic reinforces mechanical assembly of the two glass sheets and seals against liquid water or solvents.

A strip 3 supporting light-emitting diodes 2 extends along the edge, for example longitudinal, of the first sheet and is fixed at the periphery of the second face 12 of the first glass sheet 1 preferably with a scratch (for its withdrawal).

The support strip 3 is monolithic, thin, with thickness equal to 0.6 mm (5 mm max. preferably), 7 mm wide, 20 cm long. It can be of rectangular section, metallic or a conventional PCB.

Figure 15:
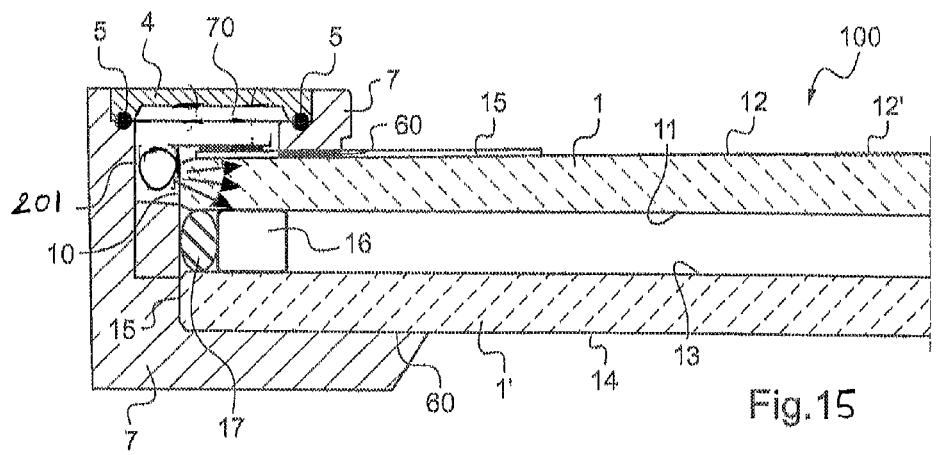
FIG. 15 shows a schematic partial cross-sectional view of the luminous glazing unit of a door of furniture notably (refrigerated) using an optical fiber as a light source in accordance with an embodiment of the invention.

The light-emitting diodes each comprise an emitting chip 2 able to emit one or more radiations in the visible, guided in the first sheet 1. The diodes are of small size, typically a few mm or less, notably of the order of 2×2×1 mm, with or without a lens, not preencapsulated to minimize their overall dimensions or encapsulated (with silicone) for protection. FIG. 15 shows an arrangement similar to FIG. 1, in which the light source is an optical fiber 201.

In the configuration illustrated, the emitting face of the chip is lateral (parallel to the strip 3). The distance between the emitting face and the injection edge is minimized, for example 5 mm, or even from 0.2 to 2 mm. The principal direction of emission is perpendicular to the face of the semiconductor chip, for example with a multiple-quantum-well active layer, of AlInGaP technology or other semiconductors. The light cone is a cone of the Lambert type, of +/−60°.

Extraction of the light 12' can be effected via the second face 12, which is for example the face internal to the furniture.

As a variant, UV LEDs are selected, notably in the UVA, for exciting the phosphors on face 12 for example.

Extraction 12' is performed by any means of scattering at the surface of the second face 12: sand blasting, etching with acid, diffusing layer, serigraphy etc., or as a variant by laser etching in the first sheet 1.

For a given group of diodes, an emitted radiation space is defined between each emitting face (chip) and the edge of the first sheet, called optical coupling space, which is preferably a gaseous medium, typically air, without glue.

Each chip and the emitted radiation space must be protected against any contamination: water, chemical etc., for the long term such as during manufacture of the glazing unit 100.

It is usual to provide the glazing unit with a preassembled seal 7, of rigid plastic, around the edge of the glazing unit, and preferably on the whole perimeter of the glazing unit (in this case laminated) and of at least face 12. The seal 7 is glued with a glue 60 or a double-sided adhesive.

For encapsulation of the flush type, it is preferable for face 14 of the second glass 1' to be left free. Second glass 1' also includes face 13 and edge 15.

The seal 7 has, according to the invention, a recess 70 for example rectangular housing the diode array (the diodes 2 on the support strip 3).

The seal 7 contributes to protection of the diodes, and therefore to long-term sealing against fluid(s) (liquid water, cleaning product, or water vapor etc.) while preserving its original functionalities.

The glazing unit further comprises a cap 4 covering the diode array, along one edge of the second face 12, and projecting beyond the injection edge 10; cap with a general face called internal oriented toward the first sheet.

The cap 4 is a rigid plastic component with a longitudinal base of general flat shape, of rectangular contour (with edges optionally rounded). The cap is called facial, because the base is opposite (and parallel) to the main faces of the laminated glazing unit.

The cap 4 is easily removable for inserting the diodes or changing them.

The design of the cap and of the assembly element thus allows integration of the diode array and also allows focusing of the array, i.e. proper positioning of the array relative to the injection edge.

Moreover, the cap is optionally provided with a blind or through recess (preferably sealed with foam or a gasket etc.) for passage of the connections.

An interfacial element 5, for interfacial sealing against fluid(s), is a gasket, of EPDM, in the form of cord with width of 5 mm, in a groove on the internal face of the cap.

The interfacial sealing element 5 is a compressed material, sealing by compression of the material being achieved by a closing force of the temporary fixing means of the cap.

As a variant shown in FIG. 1', the seal has a sealing strip 52 compressed by a flat zone 42 of the cap.

It is possible to select diodes emitting white light or colored light for mood lighting, for reading etc.

It is of course possible to provide several arrays on separate edges, and/or with separate functions (appropriate choice of power, light emitted, position and extent of the extraction zones).

The glazing unit 100 can form a door of furniture notably (refrigerated), door of a display or tank cover.

As illustrated in FIGS. 2 and 3, cap 4 is integral with the preassembled seal 7, by reversible fixing means for example two screws 81, passing through the cap and projecting beyond the internal face.

These screws are received in local undercuts of the preassembled seal (7), namely threaded holes 71 and preferably between the cord of seal 5 and the edge of the recess.

The interfacial sealing element 5 is a compressed material, sealing by compression of the material being achieved by a closing force of said fixing means of the cap 81.

The cap 4 is thus easily removable for inserting diodes or changing them.

In a first variant of cap, the fixing means of the cap are two clipping means received in two local undercuts of the functional element preferably between the sealing cord and the edge of the recess.

In a second variant of cap (alternative or additional to the first) presented in FIGS. 4 and 5, the support strip 3 of diodes 2 is held by the cap 4 for example by hooks 50'.

The design of the cap thus allows integration of the diode array and also allows focusing of the array, i.e. proper positioning of the array relative to the injection edge 10.

The cap can further comprise surfaces or stops for locating the seal 7 in the housing.

Moreover, the cap is provided with a blind or through recess 50 (sealed with foam or gasket etc.) for passage of the connections.

In a third variant of cap (alternative to the second variant) presented in FIG. 6, the internal face is provided with a means for precise positioning, and therefore alignment, 60' of the strip 3 supporting the diodes, in the form of a pusher 60' (shape concave toward the opposite side of sheet 1) bearing on the external face of the strip 3, or being a spring as a variant.

The design of the cap 4 therefore comprises an element 60' allowing a force to be exerted on the diode array previously fixed to the sheet.

It is possible to select diodes emitting in white light or colored light for mood lighting, for reading etc.

It is of course possible to provide several arrays on separate edges, and/or with separate functions (appropriate choice of power, light emitted, position and extent of the extraction zones).

Figure 7:
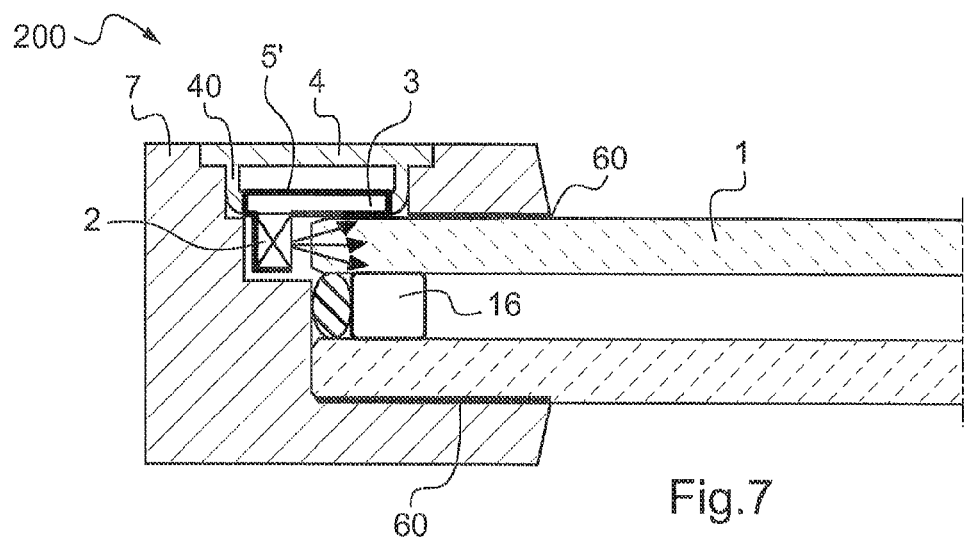

FIG. 7 shows a schematic partial cross-sectional view of a luminous multiple glazing unit of a door of furniture notably (refrigerated) 200 in another embodiment of the invention.

The glazing unit 200 differs from glazing unit 100 by
replacement of the gasket with the tropicalization varnish 5' on the PCB 3 (except on the emitting faces),
omission of the scratch, the support being fixed to the cap by an interference-fit connection 40.

Figure 8:
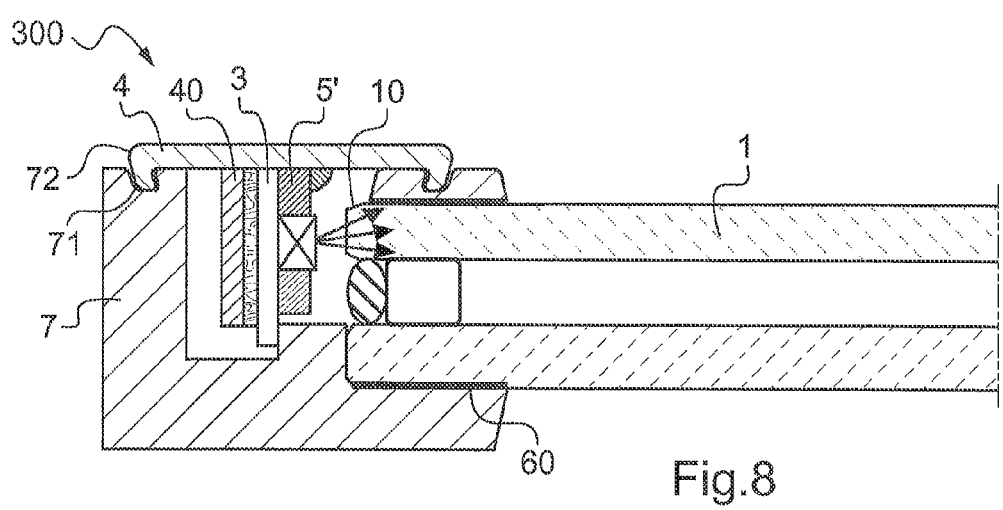

FIG. 8 shows a schematic partial cross-sectional view of a luminous multiple glazing unit of a door of furniture notably (refrigerated) 300 in another embodiment of the invention.

The glazing unit 300 differs from glazing unit 200 by:
replacement of the gasket by sealing by encapsulation 5' (except the emitting faces),
omission of the scratch, the support being fixed to the cap with glue,
double clipping (local clips along the cap) type of holding of the cap 72 in the preassembled seal 71.

Figure 9:
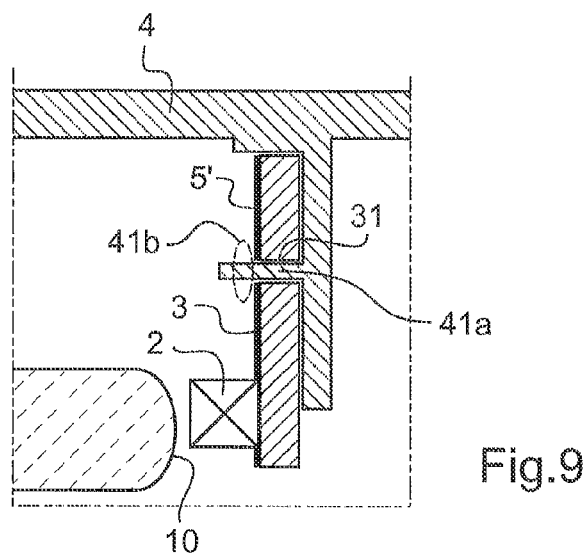

FIG. 9 shows a detail view of another configuration of mounting of the diode support 3 on the cap 4. The diode support is provided with holes 31 for placement with pins of the cap 41a and with snap-fasteners 41b.

The diode support (except diodes) is provided with a tropicalization varnish 5'.

Figure 10:
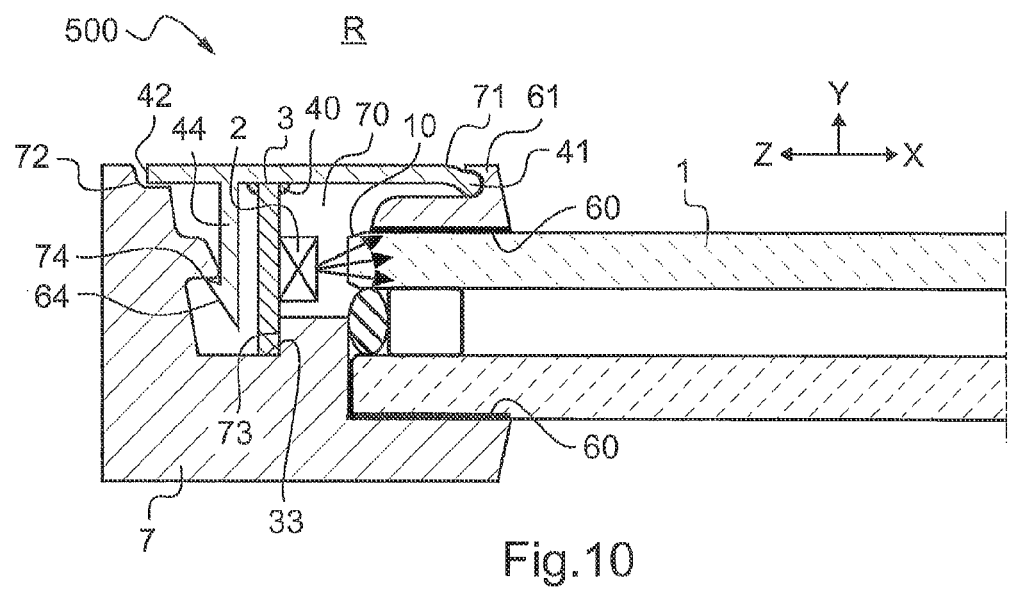

FIG. 10 shows a schematic partial cross-sectional view of a luminous multiple glazing unit of a door of furniture notably refrigerated 500 in another embodiment of the invention.

The glazing unit 500 differs from glazing unit 300 in that it is further provided with a system for assembling the diode support by rotation—reversible fixation comprising said cap 4 with a first lateral end and other parts, the first lateral end (on the right in the figure) assumes a spherical shape 41 supported (during assembly) on a first part of the preassembled seal 7 of complementary shape, called guide part 61.

The first lateral end 41 is mounted movably in rotation R relative to the glazing unit about a rotation axis parallel to the injection edge, the first lateral end comprising a plurality of (local) spheres along the cap coming up against a (flat) stop against the C-shaped preassembled seal 7 in local zones 71.

Opposite the base, the lateral end 42 (on the left in the figure) is up against the seal 7 at stop 72.

A part 44 of the cap normal to the internal face (in direction Y and oriented toward the glass) carries means for holding the cap in position in the form of clipping lugs 64, along the cap, offset relative to the supporting zones for rotation, clipping on nonreturn stops in the vertical wall 74 of the preassembled seal 7.

The zones for clipping or for rotation are indiscriminately zones with or without the diode support 3. The diode support extends longitudinally on most of the length of the cap (opposite the recess).

The diode support can extend longitudinally on (almost) all of the recess 70.

The seal 7 forms positioning stops 73 in X and in Y for the support 3.

Figure 11:
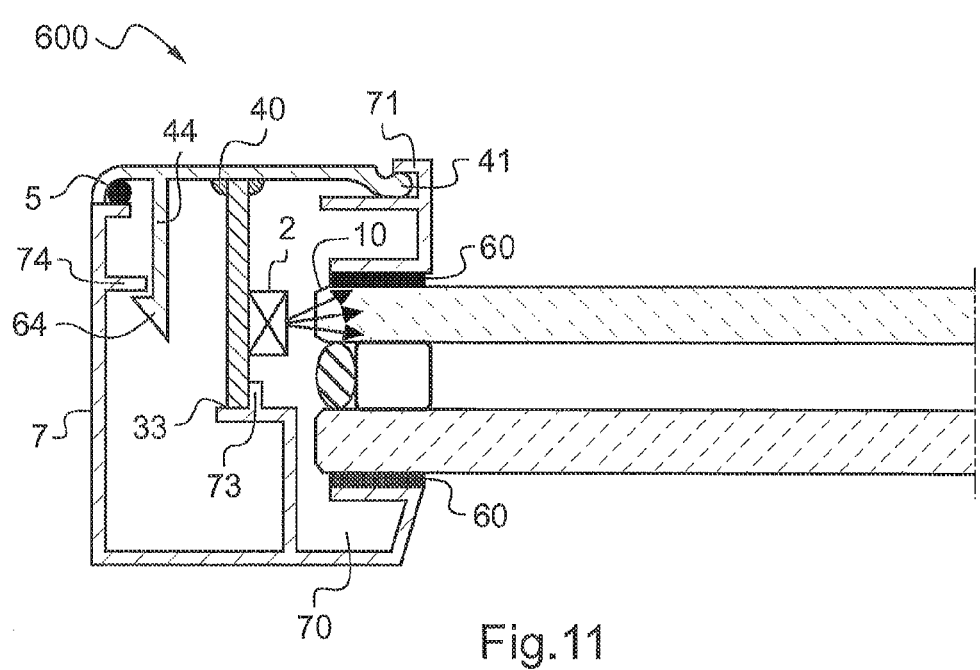

FIG. 11 shows a schematic partial cross-sectional view of a luminous multiple glazing unit of a door of furniture notably refrigerated 600 in another embodiment of the invention.

Only the differences are described relative to glazing unit 500. Here the seal 7 is coextruded and compresses an optional interfacial sealing element of the cord type 5.

FIG. 12 shows a schematic partial cross-sectional view of a luminous multiple glazing unit of a door of furniture notably refrigerated 700 in another embodiment of the invention.

The glazing unit 700 differs from glazing unit 600 by the lateral cap 4 (opposite the injection edge 10). The preassembled seal 7 has stops in X and Y 73 for the edge 33 of the diode support 3. Lateral springs 40" integrated with the cap 4 are supported flexibly on the back of support 3.

As shown in FIG. 13, the support is prepositioned in the recess 70 and (the cap 4 on the seal 7) is fixed by lateral clips 74 to the recess 70.

As a variant, the cap can be positioned relative to the injection edge of the glass by means of one or more elements projecting in the direction of the injection edge and coming up against the injection edge in zones without diodes (and optionally without support).

FIG. 14 shows a schematic partial cross-sectional view of a luminous multiple glazing unit of a door of furniture notably refrigerated 700 in another embodiment of the invention.

The glazing unit 900 is mounted by rotation and temporary fixation like glazing unit 500 but here the cap 4 is lateral. The preassembled seal 7 is glued on the glazing unit and comprises a metal core 78 surrounded locally (except zones for clipping and rotation) by a polymeric material 7".

The invention claimed is:

1. A luminous multiple glazing unit comprising:
   a first sheet of mineral glass or organic glass having a first main face and a second main face and an edge;
   a second sheet separated from the first sheet by a peripheral spacer;
   a peripheral light source supported by a source support, said light source being selected from a self-supporting optical fiber with a lateral portion forming a light emitting zone and from light-emitting diodes each comprising a semiconductor chip with an emitting face, the emitting zone or face being opposite the edge of the first sheet for propagation of visible light or ultraviolet light, or both visible and ultraviolet light injected in a thickness of the first sheet by said peripheral light source, the first sheet performing the role of guide of the injected light; and
   a light extraction device to extract the guided light to form at least one luminous zone;
   an assembly element arranged at a periphery of the glazing unit and over the edge of the first sheet so that an elongated cavity is formed between the assembly element and the edge of the first sheet when the assembly element is arranged at the periphery of the glazing unit, said assembly element including an opening for arranging said source support inside the elongated cavity, the source support being removably arranged in the elongated cavity, and
   a cap constructed to cover said opening and removably connected to the assembly element,
   wherein the opening is formed on an outer surface of the assembly element and is dimensioned to receive the source support through said opening to arrange the source support in the elongated cavity, and
   wherein the light source extends along a longitudinal direction along the edge of the first sheet and the opening and the cap extend along that same longitudinal direction when the cap covers the opening,
   wherein the luminous multiple glazing unit is a glazing unit of a door of a furniture.

2. The luminous multiple glazing unit as claimed in claim 1, comprising a cap holder to hold the cap in position in said assembly element and a source support holder to hold the source support in position, wherein the cap holder is reversible and selected from the group consisting of a clip, a screw, and a magnet or the source support holder is reversible, or both the cap holder and the source support holder are reversible.

3. The luminous multiple glazing unit as claimed in claim 1, wherein the cap is associated with an interfacial element, for interfacial sealing against one or more fluids and dust at a periphery of an internal face of the cap or on one side of the cap.

4. The luminous multiple glazing unit as claimed in claim 3, wherein the interfacial sealing element is a compressed material, sealing by compression of the material being achieved by a closing force applied when fixing the cap on the assembly element, the interfacial sealing element selected from:
   a polymer seal, the seal being in a recess or a groove of the cap, or a groove in the assembly element, and
   a foam.

5. The luminous multiple glazing unit as claimed in claim 1, wherein the source is the light-emitting diodes and wherein the source support supporting the light-emitting diodes at least is provided, prior to its integration in the glazing unit, with at least one layer for humidity protection or with an encapsulation of silicone, epoxy or acrylic, or both with at least one layer for humidity protection and with an encapsulation of silicone, epoxy or acrylic.

6. The luminous multiple glazing unit as claimed in claim 2, wherein the cap holder to hold the cap in position is separate from a positioning device to position the cap or the source support holder to hold the source support in position is separate from a positioning device to position the source support, or both the cap holder to hold the cap in position is separate from a positioning device to position the cap and the source support holder to hold the source support in position is separate from a positioning device to position the source support.

7. The luminous multiple glazing unit as claimed in claim 1, wherein a distance between the emitting face or zone and the edge is controlled by a source support positioner to position the source support in the three directions of an orthogonal frame of reference.

8. The luminous multiple glazing unit as claimed in claim 1, wherein the assembly element:
is a monolithic annular component,
or is a component in several separate parts,
or is of a material with a local recess for housing the light source.

9. The luminous multiple glazing unit as claimed in claim 1, wherein the source support is positioned in the assembly element by one or more stops, and the cap comprises or interacts with elements, which in the assembled position of the cap, hold the source support in position in the assembly element.

10. The luminous multiple glazing unit as claimed in claim 2, wherein the cap carries the source support, and the source support.

11. The luminous multiple glazing unit as claimed in claim 1, wherein assembly of the cap is by rotation and reversible fixation.

12. The luminous multiple glazing unit as claimed in claim 1, wherein the cap and the assembly element are of metal or of plastic.

13. The luminous multiple glazing unit as claimed in claim 1, wherein the assembly element is a functional element which is a metal core of a preassembled seal, hollowed out locally, optionally covered with a polymer material.

14. The luminous multiple glazing unit as claimed in claim 13, wherein the light source is the light-emitting diodes and wherein the cap is lateral, opposite the edge, and the preassembled seal has stops for an edge of the source support supporting the light-emitting diodes, thus pre-positioning the source support in a recess of the preassembled seal.

15. The luminous multiple glazing unit as claimed in claim 1, wherein the cap is essentially facial.

16. The luminous multiple glazing unit as claimed in claim 1, wherein the furniture is refrigerated.

17. The luminous multiple glazing unit as claimed in claim 15, wherein the light source is the light-emitting diodes and wherein the light-emitting diodes have lateral emission.

18. A luminous multiple glazing unit comprising:
a first transparent sheet having an outer main face, an inner main face and an edge;
a second transparent sheet separated from the first transparent sheet by a peripheral spacer, the second transparent sheet having an outer main face, an inner main face and an edge, the inner main face of the first transparent sheet facing toward the inner main face of the second transparent sheet;
a peripheral light source supported by a source support, said light source including a light emitting face that is opposite the edge of the first transparent sheet so that, in use, light emitted by the light emitting face propagates in a thickness of the first transparent sheet, the light being visible light or ultraviolet light, or both visible light and ultraviolet light;
a light extraction device arranged to extract the light propagating in said first transparent sheet to form at least one luminous zone, and
an assembly element arranged at a periphery of the glazing unit and covering the edges of the first and second transparent sheet and attached to at least one of the outer main faces of the first and the second transparent sheet so that an elongated cavity is formed between the assembly element and at least the first transparent sheet when the assembly element is arranged at the periphery of the glazing unit, said assembly element including an opening for arranging said source support inside the elongated cavity, the source support being removably arranged in the elongated cavity, and
a cap constructed to cover said opening and removably connected to the assembly element,
wherein the opening is formed on an outer surface of the assembly element and is dimensioned to receive the source support through said opening to arrange the source support in the elongated cavity, and
wherein the light source extends along a longitudinal direction along the edge of the first sheet and the opening and the cap extend along that same longitudinal direction when the cap covers the opening,
wherein the luminous multiple glazing unit is a glazing unit of a door of a furniture.

19. The luminous multiple glazing unit as claimed in claim 18, wherein the light source comprises a plurality of light-emitting diodes.

20. The luminous multiple glazing unit as claimed in claim 18, wherein the light extraction device includes scattering elements or a diffusing layer arranged on the outer main face of the first transparent sheet, or both scattering elements and a diffusing layer arranged on the outer main face of the first transparent sheet.

21. The luminous multiple glazing unit as claimed in claim 18, wherein the elongated cavity, when covered by the cap, is sealed from the outside environment.

22. The luminous multiple glazing unit as claimed in claim 18, wherein at least one of the outer main face and inner main face of the first transparent sheet is devoid of an antifrost layer, or a low-emission layer, or a heating layer, or is devoid of an antifrost layer, a low-emission layer and a heating layer.

* * * * *